(12) United States Patent
Köllner et al.

(10) Patent No.: US 6,314,141 B1
(45) Date of Patent: Nov. 6, 2001

(54) METHOD FOR RECEIVING-END AUTOMATIC IDENTIFICATION OF A SIGNAL AT THE RECEIVING END, THE SIGNAL HAVING BEEN TRANSMITTED IN ACCORDANCE WITH THE QAM MODE, AND CIRCUIT FOR CARRYING OUT THE METHOD

(75) Inventors: Herbert Köllner, Holzkirchen; Petri Solanti, Grafing, both of (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/527,116

(22) Filed: Mar. 16, 2000

Related U.S. Application Data

(63) Continuation of application No. PCT/DE98/02622, filed on Sep. 7, 1998.

(30) Foreign Application Priority Data

Sep. 16, 1997 (DE) .............................. 197 40 739

(51) Int. Cl.$^7$ .............................. H04L 5/12; H03D 1/24
(52) U.S. Cl. .............................. 375/261; 375/320
(58) Field of Search .............................. 375/261, 265, 375/320, 340; 329/304; 37/43.4

(56) References Cited

U.S. PATENT DOCUMENTS 5,381,450   1/1995   Lane ............................ 375/340
5,471,508 * 11/1995  Koslov ........................ 375/344
5,654,986 *  8/1997  Lim .............................. 375/341

FOREIGN PATENT DOCUMENTS 38 34 377 A1   4/1990   (DE) .
41 02 412 A1   7/1992   (DE) .
195 41 188 C1  4/1997   (DE) .

OTHER PUBLICATIONS

"Modem Constellation Identification: A performance comparison of two methods" (Wood et al.), dated Mar. 4, 1990, pp. 1651–1654.

* cited by examiner

Primary Examiner—Chi Pham
Assistant Examiner—Khai Tran
(74) Attorney, Agent, or Firm—Herbert L. Lerner; Laurence A. Greenberg; Werner H. Stemer

(57) ABSTRACT

A method for receiving-end automatic identification of quadrature amplitude modulation (QAM) mode (16-, 64-, 256-QAM; 32-, 128-QAM) of a received signal. The mode having been transmitted in accordance with QAM modulation, in which the received signal is demodulated with symbol values I-Sym and Q-Sym of different significance being obtained. In order to configure this identification process such that it is reliable and can be realized by relatively simple circuit, the invention provides for the significance of the symbol values I_Sym and Q_Sym to be acquired, and for the symbol values I_Sym and Q_Sym to be added in accordance with their significance in order to obtain a statistical distribution of maxima as a representative of the transmitted QAM mode.

3 Claims, 4 Drawing Sheets

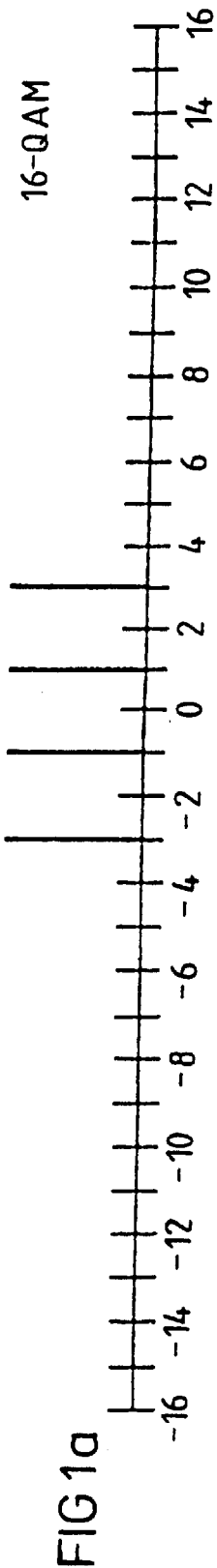
FIG 1a  16-QAM
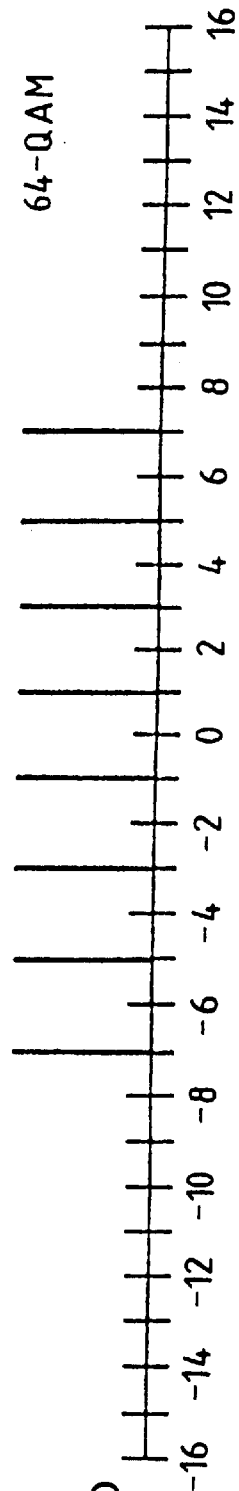
FIG 1b  64-QAM
FIG 1c  256 QAM

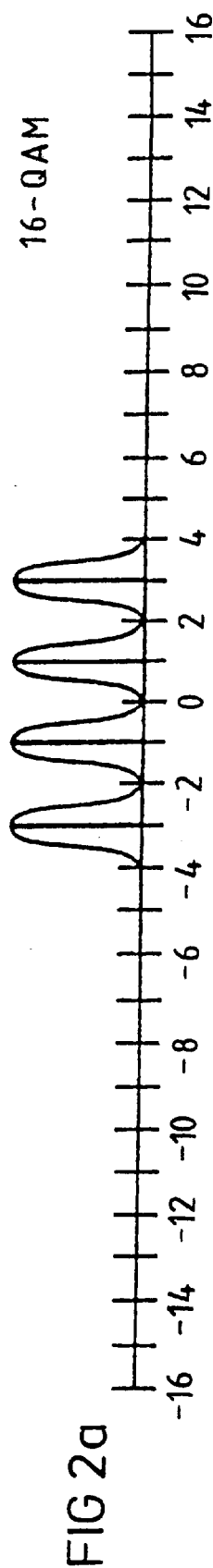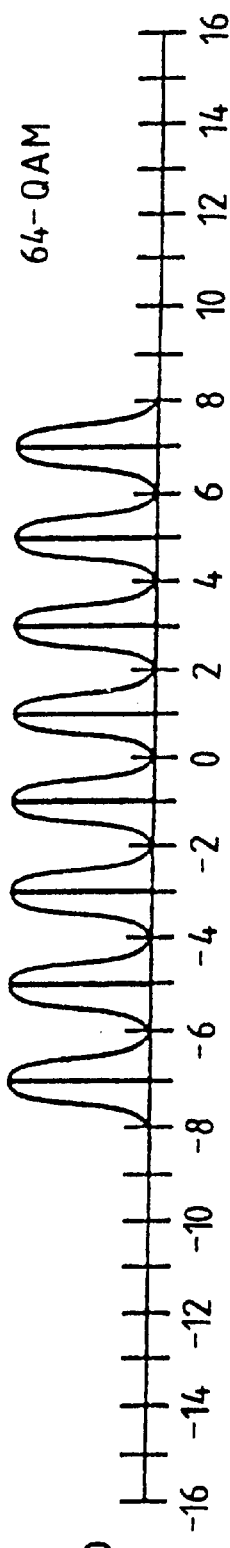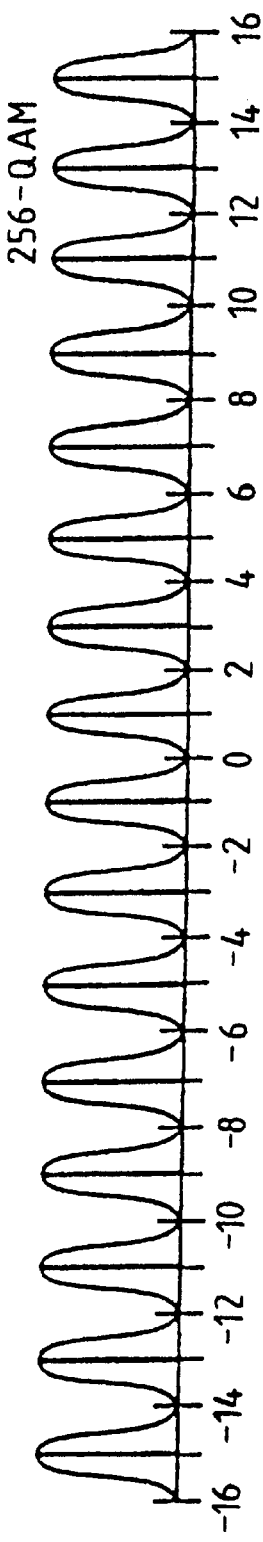
FIG 2a
FIG 2b
FIG 2c

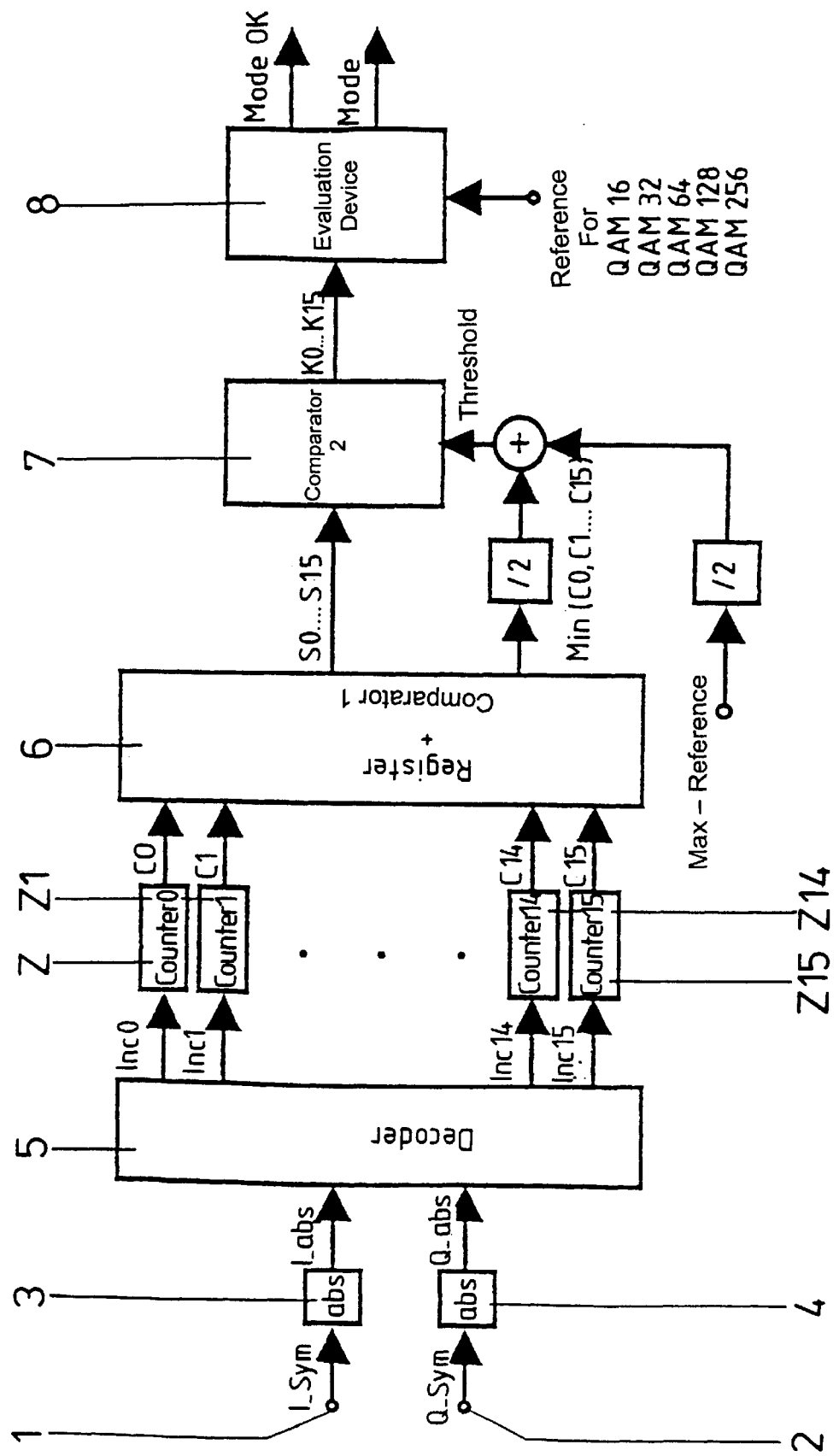

METHOD FOR RECEIVING-END AUTOMATIC IDENTIFICATION OF A SIGNAL AT THE RECEIVING END, THE SIGNAL HAVING BEEN TRANSMITTED IN ACCORDANCE WITH THE QAM MODE, AND CIRCUIT FOR CARRYING OUT THE METHOD

CROSS-REFERENCE TO RELATED APPLICATION

This is a continuation of copending International Application PCT/DE98/02622, filed Sep. 7, 1998, which designated the United States.

BACKGROUND OF THE INVENTION

Field of the Invention

The invention lies in the field of a transmitting/receiving system for digital signals transmitted according to the quadrature amplitude modulation (QAM) mode. In particular, the invention provides a method for receiving-end automatic identification of the QAM mode (16-, 64-, 256-QAM; 32-, 128-QAM) of a received signal, the mode having been transmitted in accordance with QAM modulation, in which the received signal is demodulated with symbol values I_Sym and Q_Sym of different significance being obtained. U.S. Pat. No. 5,381,450 and the article titled "Modem Constellation Identification: A Performance Comparison Of Two methods" by Wood et al., 1990 International Conference on Acoustics, Speech and Signal Processing, Vol. 3, 3.-6.04. 1990, pages 1651–1654 have disclosed using statistical evaluation methods in order to identify the QAM mode of a correspondingly transmitted signal at the receiving end. These known methods have to date required a high outlay on circuitry.

SUMMARY OF THE INVENTION

It is accordingly an object of the invention to provide a method for receiving-end automatic identification of a signal at the receiving end, the signal having been transmitted in accordance with the QAM mode, and a circuit for carrying out the method which overcome the above-mentioned disadvantages of the prior art methods and devices of this general type, which method and device can be realized with a relatively low outlay on circuitry.

With the foregoing and other objects in view there is provided, in accordance with the invention, a method for receiving-end automatic identification of a quadrature amplitude modulation (QAM) mode of a received signal, the QAM mode being transmitted in accordance with QAM modulation resulting in a transmitted QAM mode, which includes:

demodulating the received signal resulting in symbol values I-Sym and Q-Sym of different significance;

determining the significance of the symbol values I_Sym and Q_Sym; and adding the symbol values I_Sym and Q_Sym in accordance with their significance for obtaining a statistical distribution of a maxima as a representation of the transmitted QAM mode.

With regard to the method, the object is achieved by virtue of the fact that the significance of the symbol values I_Sym and Q_Sym is acquired, and that the symbol values I_Sym and Q_Sym are added in accordance with their significance in order to obtain a statistical distribution of a maxima as a representation of the transmitted QAM mode.

In accordance with a particularly advantageous development of the method, it is provided that a plurality of symbol values I_Sym and Q_Sym are acquired at the receiving end. The frequency of occurrences of the absolute values I_abs and Q_abs of the symbol values I_Sym and Q_Sym are counted, that the smallest frequency value is defined as a minimum and a largest frequency value is defined as a maximum. A decision level (threshold value) is defined as (maximum+minimum)/2, that the individual frequency values are related to the decision level in order to obtain a bit vector, and that the bit vector is compared with modulation-specific bit masks (reference pattern) in order to identify the QAM mode.

The above-mentioned object is achieved with regard to the circuit for carrying out the method according to the invention, in accordance with the preferred variant evinced above, by virtue of the fact that the below listed components are provided. A first absolute-value forming unit to which the symbol value I_Sym is applied and which serves for generating the absolute value I_abs is provided. A second absolute-value forming unit to which the symbol value Q_Sym is applied and which serves for generating the absolute value Q_abs is provided. A decoder is provided whose inputs are connected to the outputs of the first and second absolute-value forming units in order to generate from the absolute values counting pulses in accordance with the frequency of occurrences of the absolute values. A plurality of counters in accordance with the number of frequencies for the purpose of counting the counting pulses is provided. A buffer store for buffer-storing the counter values of the counters is provided. A device which, in response to a predetermined maximum counter reading being reached by one of the counters, determines the minimum counter reading among the further counters and forms the threshold value (decision level) as (maximum counter reading+minimum counter reading)/2 is provided. A comparator that compares the buffer-stored counter values with the threshold value, and an evaluation device, which compares the comparison results with a reference pattern and outputs a corresponding QAM mode in the event of correspondence with a reference pattern is provided.

Other features which are considered as characteristic for the invention are set forth in the appended claims.

Although the invention is illustrated and described herein as embodied in a method for receiving-end automatic identification of a signal at the receiving end, the signal having been transmitted in accordance with the QAM mode, and a circuit for carrying out the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1a is a schematic representation of in-phase components of a signal transmitted in accordance with 16-QAM modulation;

FIG. 1b is a schematic representation of in-phase components of a signal transmitted in accordance with 64-QAM modulation;

FIG. 1c is a schematic representation of in-phase components of a signal transmitted in accordance with 256-QAM modulation;

FIG. 2a is a schematic representation of a reception signal of the signal transmitted in accordance with 16-QAM modulation;

FIG. 2b is a schematic representation of a reception signal of the signal transmitted in accordance with 64-QAM modulation;

FIG. 2c is a schematic representation of a reception signal of the signal transmitted in accordance with 256-QAM modulation;

FIG. 4 is a block circuit diagram of a circuit for receiving-end automatic identification of a QAM modulation of a received signal transmitted in a QAM mode according to the invention.

DESCRIPTION OF THE PREFERRED EMBODIMENTS

Figure 3:
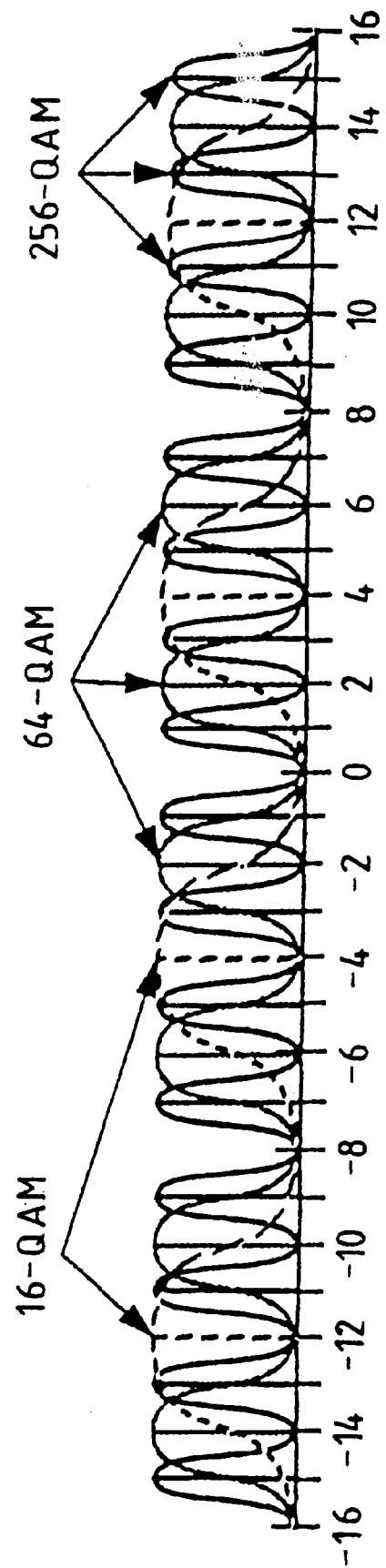
FIG. 3 is a schematic representation of a relative distribution of a maxima and a minima of the reception signal modulated in accordance with 16-, 64- and 256-QAM.

In all the figures of the drawing, sub-features and integral parts that correspond to one another bear the same reference symbol in each case. Referring now to the figures of the drawings in detail and first, particularly, to FIGS. 1a–1c thereof. In quadrature amplitude modulation (QAM) input bit patterns of a transmitted signal are divided into in-phase and quadrature components which are additionally coded in 2 to 16 signal levels (4–256-QAM). The individual signal levels have identical separations in the entire signal range of at most −4 to+4, for example −3, −1, 1, 3, for 16-QAM. As is known, a unit of measurement is not important in this case since only the relative separations are present for evaluation. FIGS. 1a, 1b and 1c respectively illustrate the in-phase components of 16-QAM, 64-QAM and 256-QAM.

While FIGS. 1a, 1b and 1c show the signal waveform of the transmitted signal, FIGS. 2a, 2b and 2c illustrate a signal waveform of a respective signal at a receiving end. Specifically, a received signal as shown in FIG. 2a corresponds to the transmission signal as shown in FIG. 1a; the received signal as shown in FIG. 2b corresponds to the transmitted signal as shown in FIG. 1b, and the received signal as shown in FIG. 2c corresponds to the transmitted signal as shown in FIG. 1c. As revealed by FIGS. 2a, 2b and 2c, the received signal differs from the respective transmitted signal by a Gaussian signal distribution symmetrical around the respective symbol values. The broadening of the original symbol values is based on noise, distortion and echo components that are added to the transmitted signal until reception.

As revealed by FIGS. 2a, 2b and 2c, the maxima form around the odd symbol values and the minima form around the even symbol values. If all the constellations are extended to 256-QAM, or if each constellation has the highest resolution, the maxima and minima are distributed in a constellation-dependent manner, as shown in FIG. 3. The positions of these points or symbol values can be analyzed statistically in order to identify the correct constellation even given the presentation of such interference levels with which a quasi error-free reception is otherwise no longer possible.

The method of the invention for identifying the constellation or the QAM mode of the received signal, the mode having been transmitted in accordance with QAM modulation, makes use of the uniform distribution of the transmitted symbols. Accordingly, the in-phase and quadrature components can be combined and the absolute values can be used to reduce the volume of data to be analyzed.

The invention provides first for a plurality of symbols, for example more than 100 symbols, to be read, and then for the frequency of occurrences of the absolute values of the respective signal level to be counted. The smallest frequency value is then defined as a minimum and the largest frequency value is defined as a maximum. A decision level or a so-called threshold level is defined in the middle between the maxima and minima that have been calculated. The individual frequency values are then compared with the decision level and, if appropriate, assigned to the maxima or the minima. A bit vector thus obtained is compared with constellation-specific specific bit masks or reference values, from which the transmitted constellation can be identified with statistical accuracy. The method according to the invention operates not just with the 16-QAM, 64-QAM and 256-QAM constellations mentioned above, but also with the 32-QAM and 128-QAM cross-constellations.

FIG. 4 illustrates a circuit for carrying out the method according to the invention. The circuit serves for identifying the QAM mode on the basis of 25 symbol values I_Sym and Q_Sym which are present after the demodulation of the received signal at an output of a quadrature demodulator.

The word width of the signal depends on the transmitted QAM mode. The range of values of I_Sym and Q_Sym is −4 . . . 3 in the case of 16-QAM (2's complement) and −16 . . . 15 in the case of 256-QAM. If the symbol values I_Sym and Q_Sym are represented graphically, a quadratic arrangement is produced over the four quadrants, and, per quadrant, 2 rows/columns result in the case of 16-QAM and 8 rows/columns result in the case of 256-QAM. If the symbol values are added in accordance with their significance (the symbol value 0 increments a counter 0, and the symbol value 1 increments a counter 1, etc. as explained below), a statistical distribution dependent on the transmitted QAM mode is produced. In this case, two maxima are produced in the case of 16-QAM, three maxima in the case of 32-QAM and four maxima in the case of 64-QAM, etc. The symbol values or signals I_Sym and Q_Sym are present at the input 1 and at the input 2, respectively, of the circuit.

The input is followed by a first and a second absolute-value forming device 3 and 4, respectively, in order to calculate the respective absolute values I_abs and Q_abs from the signals I_Sym and Q_Sym, as a result of which these signals are reduced to 4 quadrants.

The absolute values I_abs and Q_abs are each fed into a decoder 5, which generates from them counting pulses Inc0 . . . Inc15 for counters Z0 . . . Z15 which are connected downstream of the decoder and at whose outputs the counter readings C0 . . . C15 are present. For the case where the signals or symbol values I_Sym and Q_Sym are identical, the respectively assigned counter Z0 . . . Z15 increments by 2. After one of the counters Z0 . . . Z15 has reached a defined maximum, an evaluation of the counter readings is started in a first evaluation device 6. The first evaluation device 6 contains a comparator and a register to which the counter readings C0 . . . C15 are applied on the input side, and from the counter readings C0 . . . C15 the minimum is determined.

The decision level or threshold value explained above is then calculated as: min/2+max/2. This value is compared with each of the counter values S0 . . . S15, which are buffer-stored in the register of the evaluation device 6 and are present at the output of the first evaluation circuit 6. In a comparator 7 connected downstream, the output signals K0 . . . K15 of which comparator, as the result of the comparison in the comparator 7, assume the value "1", if the threshold value is less than the counter value S0 . . . S15; the output signals otherwise assume the value "0".

The comparator output signals K0 . . . K15 are input into an input of a second evaluation device 8, which has a further series of inputs at which reference values for 16-QAM to 256-QAM are present, the reference values being stored in a memory and defining a reference pattern. The reference pattern is compared with the contents of the comparator output signals K0 . . . K15. In the event of a correspondence with the reference pattern, the corresponding bit combination is set for the output signal of the second evaluation device, whereupon the second evaluation circuit goes to "1" at its output signal Mode_OK, corresponding to successful automatic identification of the QAM mode at the transmitter end.

We claim:

1. A method for receiving-end automatic identification of a quadrature amplitude modulation (QAM) mode of a received signal, the QAM mode being transmitted in accordance with QAM modulation resulting in a transmitted QAM mode, which comprises:

demodulating the received signal resulting in symbol values I-Sym and Q-Sym of different significance;

acquiring a plurality of the symbol values I_Sym and Q_Sym at a receiving end;

counting a frequency of occurrences of absolute values I_abs and Q_abs of the symbol values I_Sym and Q_Sym, and a smallest frequency value is defined as a minimum and a largest frequency value is defined as a maximum;

defining a threshold value as (the maximum+the minimum)/2;

comparing the individual frequency values with the threshold value to obtain comparison results; and comparing the comparison results with modulation-specific reference patterns to identify the QAM mode.

2. The method according to claim 1, which comprises:

performing the first comparison step by comparing the individual frequency values with the threshold value to obtain a bit vector; and performing the second comparison step by comparing the bit vector with modulation-specific bit masks to identify the QAM mode.

3. A circuit for receiving-end automatic identification of a quadrature amplitude modulation (QAM) mode of a received signal, comprising:

a first absolute-value forming unit for receiving a symbol value I_Sym and generating an absolute value I_abs;

a second absolute-value forming unit for receiving a symbol value Q_Sym and generating an absolute value Q_abs;

a decoder having inputs receiving the absolute value I_abs and the absolute value Q_abs for generating from the absolute value I_abs and the absolute value Q_abs counting pulses in accordance with a frequency of occurrences of the absolute value I_abs and the absolute value Q_abs;

a plurality of counters in accordance with a number of the frequency of occurrences receiving and counting the counting pulses resulting in counter values;

a buffer store for buffer-storing the counter values of said counters;

a device which, in response to a predetermined maximum counter reading being reached by one of said counters, determines a minimum counter reading among other ones of said counters and forms a threshold value defined by the equation (the maximum counter reading+the minimum counter reading)/2;

a comparator comparing the counter values buffer stored in said buffer store with the threshold value resulting in comparison results; and an evaluation device comparing the comparison results with reference patterns and outputting a corresponding QAM mode in an event of a match with one of the reference patterns.

\* \* \* \* \*